(12) United States Patent
Maruoka

(10) Patent No.: US 8,146,638 B2
(45) Date of Patent: Apr. 3, 2012

(54) HEAVY-DUTY PNEUMATIC TIRE WITH L-SHAPED INNER BEAD APEX

(75) Inventor: Kiyoto Maruoka, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 369 days.

(21) Appl. No.: 12/429,599

(22) Filed: Apr. 24, 2009

(65) Prior Publication Data

US 2009/0294011 A1 Dec. 3, 2009

(30) Foreign Application Priority Data

May 28, 2008 (JP) .................................. 2008-139917

(51) Int. Cl.
*B60C 15/06* (2006.01)
(52) U.S. Cl. ........................ 152/541; 152/543
(58) Field of Classification Search .................. 152/541, 152/543
See application file for complete search history.

(56) References Cited

U.S. PATENT DOCUMENTS
2008/0035261 A1 * 2/2008 Maruoka

FOREIGN PATENT DOCUMENTS
JP 2007-230400 A 9/2007
JP 2008037367 A * 2/2008

* cited by examiner

*Primary Examiner* — Adrienne C Johnstone
(74) *Attorney, Agent, or Firm* — Birch, Stewart, Kolasch & Birch, LLP

(57) ABSTRACT

A heavy-duty pneumatic tire includes a carcass ply turned up around a bead core in each bead portion from the inside to the outside of the tire so as to have a pair of turnup portions and a main portion therebetween; and a bead apex and an L-shaped reinforcing cord layer. The bead apex includes: an L-shaped high-modulus inner bead apex including a base part and a radial part; and a delta-shaped low-modulus outer bead apex disposed on the radially outside of the base part of the L-shaped inner bead apex and on the axially outside of the radial part of the L-shaped inner bead apex. The L-shaped reinforcing cord layer is made up of an radially inner part extending on the radially inner side of the bead core, and an radially outer part extending along the axially outer surface of the carcass ply turnup portion.

4 Claims, 6 Drawing Sheets

Comparative example

Comparative example

Prior Art

HEAVY-DUTY PNEUMATIC TIRE WITH L-SHAPED INNER BEAD APEX

BACKGROUND OF THE INVENTION

The present invention relates to a heavy-duty pneumatic tire, more particularly to a bead structure capable of reducing the weight of the bead portion without sacrificing the bead durability.

Recent years, in order to protect the global environment, automobiles are strongly required to reduce the fuel consumption. Accordingly, tire manufacturers devote all effort to improve tire's factors capable of reducing the fuel consumption. For example, the rolling resistance and weight of the tire are important factors. In the case of heavy-duty pneumatic tires for truck, bus and the like, in comparison with passenger car tires, the tire size is large and the tire is rigid, therefore, it is effective to improve the tire weight rather than the rolling resistance.

As well known in the art, bead portions of a heavy-duty pneumatic tires are conventionally provided with a U-shaped steel-cord reinforcing layer (c) as shown in FIG. 6 for example.

The present inventor, therefore, made a study on the bead structures in order to reduce the tire weight by reducing the weight of the steel-cord reinforcing layer.
For example, if the axially inner part and outer part of the U-shaped steel-cord reinforcing layer are reduced in the radial heights from those of the reinforcing layer as shown in FIG. 5 to those of the reinforcing layer as shown in FIG. 6, then the bending rigidity of the bead portion is decreased. Accordingly, the bead portion under load is largely bent axially outwardly, and a large stress concentrates on the radially outer end b1e of the carcass ply turnup portion b1. As a result, bead failures such as cord end loose, ply edge separation and the like becomes liable to occur, and the bead durability is decreased.

SUMMARY OF THE INVENTION

It is therefore, an object of the present invention to provide a heavy-duty pneumatic tire in which, in order to reduce the tire weight, the weight of the bead portions is reduced without sacrificing the bead durability.

According to the present invention, a heavy-duty pneumatic tire comprises:
a tread portion;
a pair of sidewall portions;
a pair of bead portions each with a bead core therein;
a carcass ply of cords extending the bead portions through the tread portion and sidewall portions and turned up around the bead core in each of the bead portions from the inside to the outside of the tire so as to have a pair of carcass ply turnup portions and a carcass ply main portion therebetween;
a bead apex disposed in each of the bead portions and extending radially outwardly from the bead core in a tapered manner, wherein
the bead apex includes
an L-shaped inner bead apex which is made of a high-modulus rubber, and
an outer bead apex which is made of a low-modulus rubber having a lower modulus than that of the L-shaped inner bead apex,
the L-shaped inner bead apex comprises
a base part which extends along a radially outer surface of the bead core, and
a radial part which extends radially outwardly from the axially inner end of the base part along the carcass ply main portion and terminates at a position radially outside the radially outer end of the carcass ply turnup portion, the radial part having a thickness gradually decreasing towards the radially outside of the tire,
the outer bead apex is disposed on the radially outside of the base part of the L-shaped inner bead apex and on the axially outside of the radial part of the L-shaped inner bead apex, the outer bead apex extending radially outwardly in a tapered manner; and
an L-shaped reinforcing cord layer disposed in each of the bead portions, and comprising
an inner part which extends on the radially inner side of the bead core in a direction substantially parallel to the bead base, and
an outer part which extends radially outwardly from the inner part along the axially outer surface of the carcass ply turnup portion and terminates so as to have a radially outer end positioned radially inside the radially outer end of the carcass ply turnup portion.

In the following description, various dimensions, positions and the like refer to those under a normally inflated unloaded condition of the tire unless otherwise noted.

The normally inflated unloaded condition is such that the tire is mounted on a standard wheel rim and inflate to a standard pressure but loaded with no tire load.
The standard wheel rim is a wheel rim officially approved for the tire by standard organization, i.e. JATMA (Japan and Asia), T&RA (North America), ETRTO (Europe), STRO (Scandinavia) and the like. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various cold Inflation Pressures" table in TRA or the like. The standard load is the "maximum load capacity" in JATMA, the "Load Capacity" in ETRTO, the maximum value given in the above-mentioned table in TRA or the like.

DESCRIPTION OF THE PREFERRED EMBODIMENTS

Figure 1:
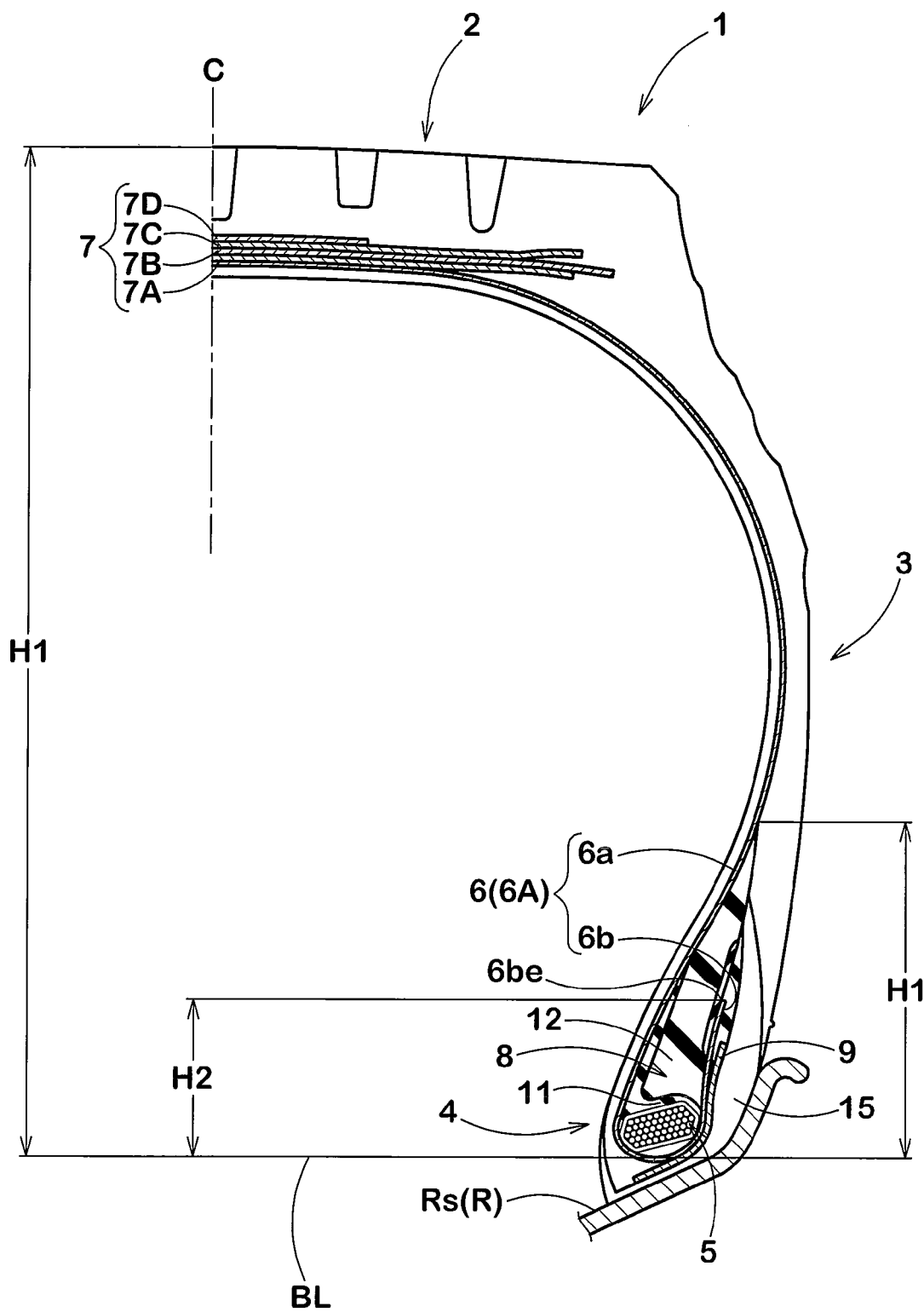
FIG. 1 is a cross-sectional view of a heavy-duty pneumatic tire according to the present invention.

Embodiments of the present invention will now be described in detail in conjunction with accompanying drawings.

In the drawings, heavy-duty pneumatic tire 1 according to the present invention comprises: a tread portion 2; a pair of sidewall portions 3; a pair of bead portions 4 each with a bead core 5 therein; a toroidal carcass 6 extending between the bead portions 4 through the tread portion 2 and sidewall portions 3; a belt 7 disposed radially outside of the carcass 6 in the tread portion 2; a bead apex 8 disposed in each of the bead portions and extending radially outwardly from the bead core 5 in a tapered manner towards the radially outer end thereof; a reinforcing cord layer 9 disposed in each of the bead portions 4; and a clinch rubber layer 15 disposed in each of the bead portions 4.

In this embodiment, the tire 1 is a tubeless tire to be mounted on a 15-degree-taper center-drop rim R.

The carcass 6 is composed of at least one ply 6A, in this embodiment only one ply of steel cords arranged radially at angles of 80 to 90 degrees with respect to the tire equator C. The carcass ply 6A extends between the bead portions 4 through the tread portion 2 and sidewall portions 3 and is turned up around the bead core 5 in each of the bead portions from the axially inside to the axially outside so as to have a pair of carcass ply turnup portions 6b and a carcass ply main portion 6a therebetween.

Preferably, the radial height H2 from the bead base line BL of the radially outer end 6be of the carcass ply turnup portion 6b is set in a range of not less than 8%, more preferably not less than 10%, but not more than 25%, more preferably not more than 20% of the tire cross-section height H.

If the radial height H2 is less than 8%, then the bending rigidity of the bead portion 4 becomes insufficient. Further, the carcass ply becomes liable to cause so called blowout. On the other hand, if the radial height H2 is more than 25%, then the tire weight unfavorably increases. Further, the tire durability becomes liable to decrease because the radially outer end 6be reaches to the sidewall portion 3 which is repeatedly subjected to a large deformation during running.

The belt 7 comprises two cross breaker plies of parallel steel cords. In this embodiment, the belt 7 is composed of four breaker plies of parallel steel cords: the radially innermost ply 7A of steel cords laid at an angle of from 50 to 70 degrees with respect to the tire equator C; and second, third and radially outermost fourth plies 7B, 7C and 7D of parallel steel cords laid at small angles of from 15 to 35 degrees with respect to the tire equator C.

The bead core 5 is formed by winding a steel wire a number of times in a predetermined order into a predetermined cross sectional shape (a hexagonal shape for example). In order to prevent the windings of the wire from loosening, a wrapping layer 16 is wound therearound. For example, a rubber compound alone, a rubberized textile such as canvas or the like can be used as the material of the wrapping layer 16.

The clinch rubber layer 15 is made of a wear-resistant hard rubber compound having a hardness of from 60 to 90 degrees, more preferably 65 to 85 degrees. The clinch rubber layer 15 is disposed along the axially outer surface and bottom surface of the bead portion defining the surface contacting with the bead seat and flange of the wheel rim when the tire is mounted thereon. In this embodiment, the clinch rubber layer 15 is extended to the bead toe and then extended radially outwardly from the bead toe in a tapered manner.

In this specification, the values of the hardness refer to those measured with a type-A durometer according to the Japanese Industrial standard K6253 (durometer A hardness).

The reinforcing cord layer 9 is made up of an radially inner part 9a extending on the radially inner side of the bead core 5 along a direction substantially parallel to the bottom surface of the bead portion, and an radially outer part 9b continued from the radially inner part 9a and extending radially outwardly along the axially outer surface of the carcass ply turnup portion 6b.

Thus, the reinforcing cord layer 9 has a substantially L-shaped cross sectional shape.

In the case of the L-shaped reinforcing cord layer 9, the covering range and weight become small in comparison with the conventional U-shaped reinforcing cord layer, and accordingly, the tire weight can be reduced.

The radially outer end 9be of the radially outer part 9b of the reinforcing cord layer 9 is positioned radially inside the radially outer end 6be of the carcass ply turnup portion 6b of the carcass ply 6A. Thereby, the reinforcing cord layer 9 is further downsized, and the tire weight can be further decreased.

Furthermore, advantageously, the springback of the L-shaped reinforcing cord layer 9 during building the green tire becomes small in comparison with the U-shaped reinforcing cord layer. Accordingly, dimensional variations during building the green tire can be reduced, and it is possible to improve the tire uniformity.

In the reinforcing cord layer 9, as explained, the radial height H4 from the bead base line BL of the radially outer end 9be of the radially outer part 9b is less than the radial height H2 of the carcass ply turnup portion 6b, but if the difference therebetween is too small, a large rigidity difference is formed in the bead portion 4, and it becomes difficult to mitigate the stress at the radially outer end 6be of the carcass ply turnup portion 6b.

Therefore, the radial distance D2(=H2−H4) between the radially outer end 6be of the carcass ply turnup portion 6b and the radially outer end 9be of the radially outer part 9b is preferably not less than 5 mm, more preferably not less than 7 mm, still more preferably not less than 8 mm.

If on the other hand the radial height H4 of the radially outer part 9b is too small, then it becomes difficult to increase the bending rigidity of the bead portion 4, therefore, the radial height H4 of the radially outer part 9b is preferably more than the radial height H5 of the flange of the wheel rim R.

In this embodiment, the reinforcing cord layer 9 is made up of a single ply 9A of steel cords inclined at an angle with respect to the tire circumferential direction, and the inclination angle is preferably set in a range of not less than 35 degrees, more preferably not less than 45 degrees, but not more than 65 degrees, more preferably not more than 60 degrees with respect to the tire circumferential direction. If the angle of the steel cords is less than 35 degrees, then the reinforce effect becomes insufficient. As a result, if the tire is used under extremely heavy load conditions for example, the clinch rubber layer 15 disposed axially outside the reinforcing cord layer 9 fatigues and is liable to be collapsed at an early stage. If the angle of the steel cords is more than 65 degrees, the angular difference from the carcass cords is decreased, therefore, its function to protect the carcass 6 tends to become insufficient.

Figure 3:
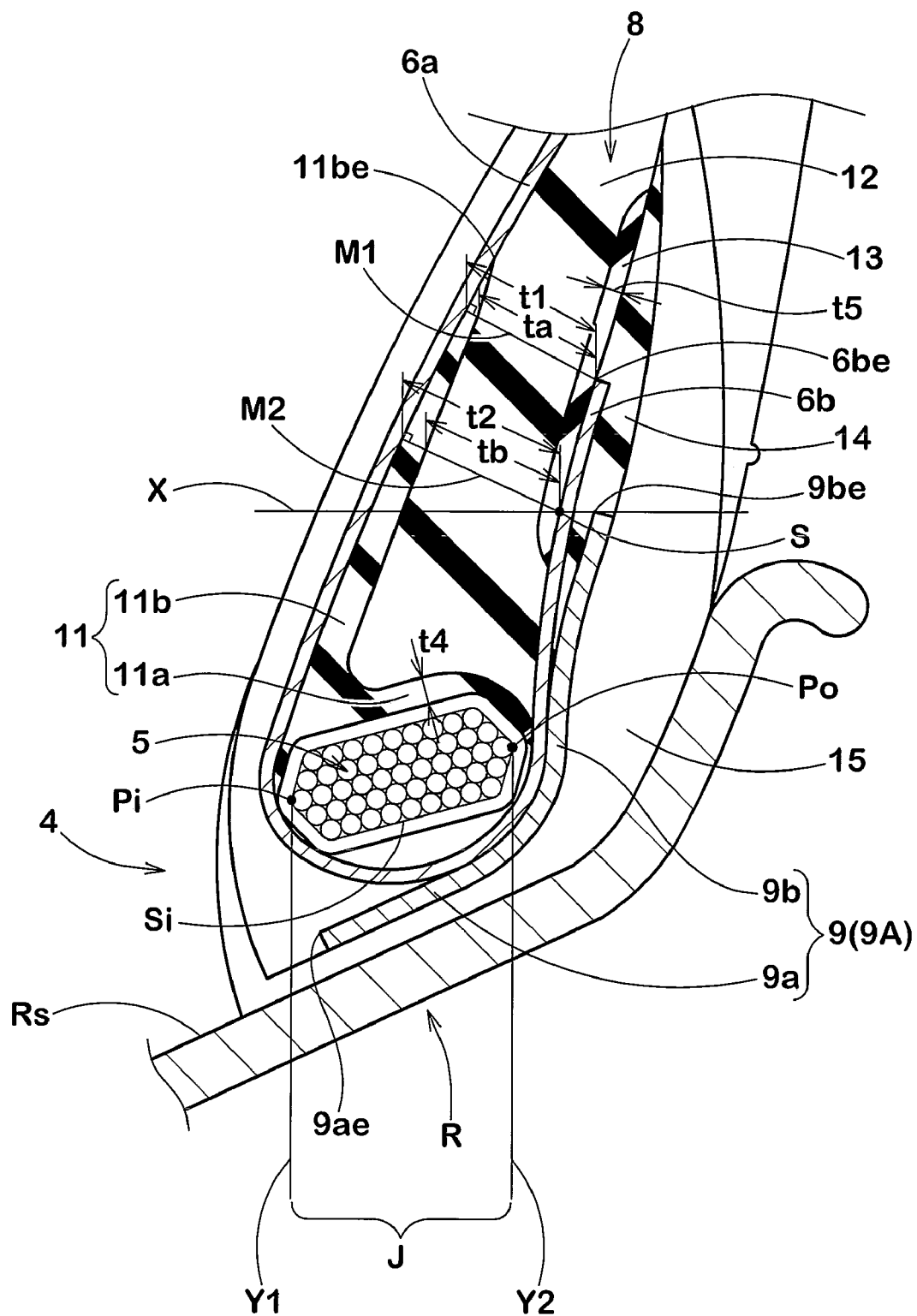

Further, as shown in FIG. 3, it is preferable for the reinforcing cord layer 9 that the axially inner end 9ae of the radially inner part 9a is located within a radially inside region J of the bead cores 5. Here, the region J is defined as extending between a first radial line Y1 extending radially inwardly from the axially innermost end point Pi of the bead core 5, and a second radial line Y2 extending radially inwardly from the axially outermost end point Po of the bead core 5. By limiting the position of the axially inner end 9ae of the radially inner part 9a within the region 3, the radially inner part 9a is downsized, and accordingly, the tire weight saving is ensured.

In each of the bead portions, the bead apex 8 is disposed between the carcass ply turnup portion 6b and the carcass ply main portion 6a, and extends radially outwardly from the bead core 5 (inclusive of the wrapping layer 16) while tapering up to its radially outer end 8e.

The radially outer end 8e of the bead apex 8 is positioned radially outside the radially outer end 6be of the carcass ply turnup portion 6b in order to increase the bending rigidity of the bead portion 4. Thereby, the steering stability can be improved, and stress at the radially outer end 6be of the carcass ply turnup portion 6b can be reduced.

Preferably, the radial height H1 from the bead base line BL of the radially outer end 8e of the bead apex 8 is set in a range of not less than 20%, more preferably not less than 25%, but not more than 50%, more preferably not more than 45% of the tire cross-section height H.

Figure 2:
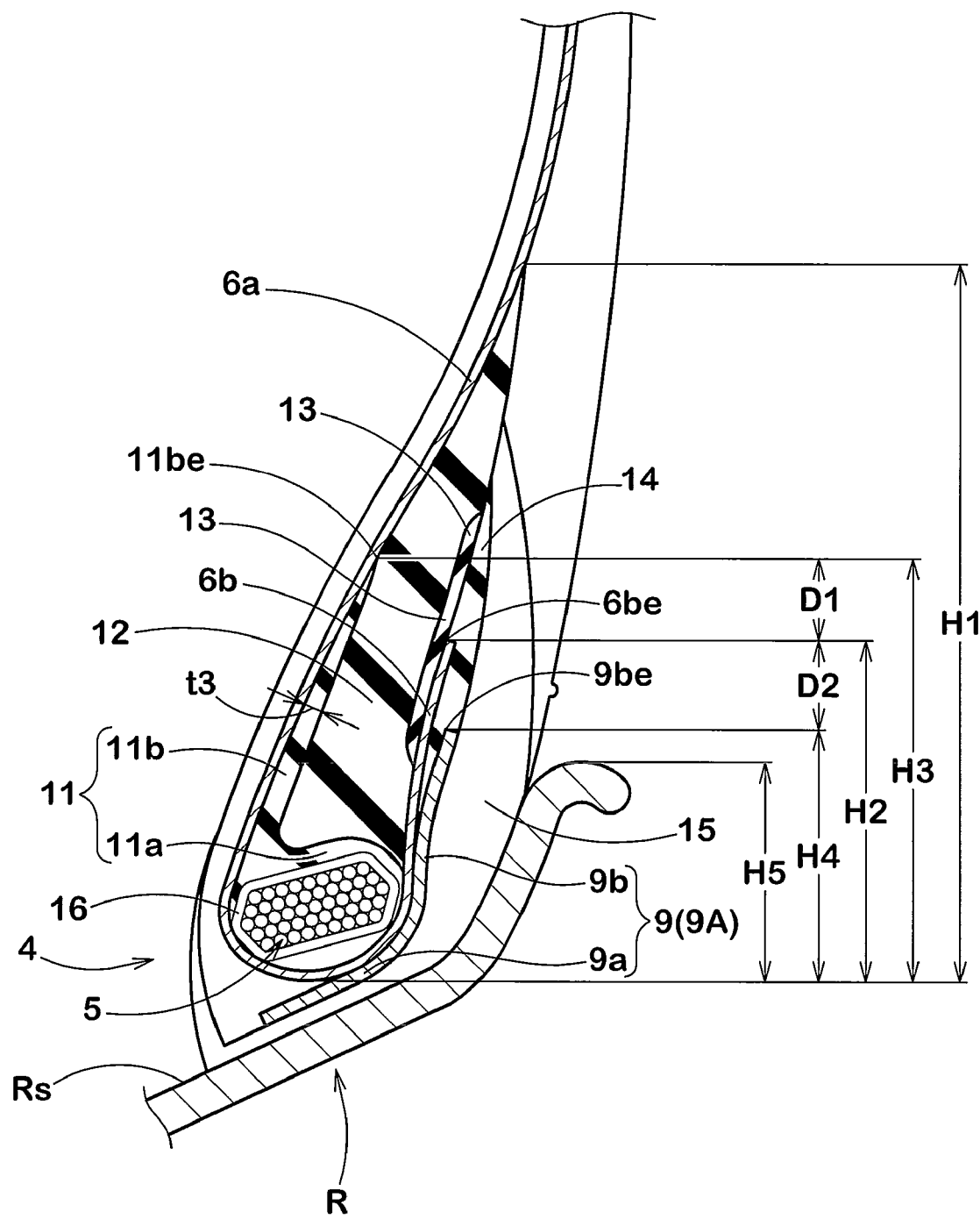
FIG. 2 and FIG. 3 are enlarged cross-sectional views of the bead portion thereof.

As shown in FIG. 2, the bead apex 8 is made up of an L-shaped inner bead apex 11 made of a high-modulus rubber and a delta-shaped outer bead apex 12 made of a low-modulus rubber.

The L-shaped inner bead apex 11 comprises:
a base part 11a extending along the radially outer surface of the bead core 5; and
a radial part 11b extending radially outwardly from the axially inner end of the base part 11a along the carcass ply main portion 6a.

The base part 11a abuts on the radially outer surface of the bead cores 5, and comprises:
a middle part having a substantially constant thickness t4 of from about 0.5 to 3.0 mm;
an axially outer part having a thickness gradually decreasing towards the axially outside of the tire and terminating at a position between the axially outer surface of the bead cores 5 and the carcass ply turnup portion 6b; and
an axially inner part terminating at a position between the axially inner surface of the bead cores 5 and the carcass ply main portion 6a.

The radial part 11b has its radially outer end 11be positioned radially outside the radially outer end 6be of the carcass ply turnup portion 6b. The thickness of the radial part 11b is gradually decreased towards the radially outside of the tire.

As explained above, since the L-shaped inner bead apex 11 can pinch the outer bead apex 12 between its radial part 11b and base part 11a, and the radial part 11b extends radially outwardly from the bead core abutting the axially outer surface of the carcass ply main portion 6a, the bead apex 8 as a whole can effectively increase the axially outward bending rigidity of the bead portion 4.

Since the radial part 11b extends radially outwardly beyond the radially outer end 6be of the carcass ply turnup portion 6b, the radial part 11b can mitigate the stress concentration on the radially outer end 6be, and thereby failures liable to occur at the radially outer end 6be such as cord end loose can be prevented.

Since the outer bead apex 12 has the relatively low modulus, the outer bead apex 12 can absorb the compressive strain occurring on the carcass ply turnup portion side, and thereby the stress of the carcass cords can be effectively mitigated.

If the complex elastic modulus $E^*1$ of the L-shaped inner bead apex 11 is low, then the amount of deformation of the bead portion 4 during running is increased, and the stress concentrates on the radially outer end 6be of the carcass ply turnup portion 6b.

Therefore, the complex elastic modulus $E^*1$ of the L-shaped inner bead apex 11 is preferably not less than 30.0 MPa, more preferably not less than 50.0 MPa.

If the complex elastic modulus $E^*1$ is excessively high, on the other hand, then the ride comfort is remarkably deteriorated, and further, the stress is liable to concentrate on the radially outer end 11be of the radial part 11b of the L-shaped inner bead apex 11.

Therefore, the complex elastic modulus $E^*1$ of the L-shaped inner bead apex 11 is preferably not more than 90.0 MPa, more preferably not more than 80.0 MPa.

If the complex elastic modulus $E^*2$ of the outer bead apex 12 is too low, the bending rigidity of the bead portion 4 becomes insufficient. If too high, on the other hand, the stress mitigating effect becomes insufficient.

Therefore, the complex elastic modulus $E^*2$ of the outer bead apex 12 is preferably set in a range of not less than 2.0 MPa, more preferably not less than 3.0 MPa, but not more than 15.0 MPa, more preferably not more than 10.0 MPa.

If the difference ($E^*1-E^*2$) between the complex elastic modulus $E^*1$ of the L-shaped inner bead apex 11 and the complex elastic modulus $E^*2$ of the outer bead apex 12 becomes excessively increased, then the stress tends to concentrate on the interface therebetween. If the difference ($E^*1-E^*2$) becomes excessively small, then it is difficult to control the bending of the bead portion and mitigate the stress.

Therefore, the difference ($E^*1-E^*2$) is preferably set in a range of not less than 40.0 MPa, more preferably not less than 50.0 MPa, but not more than 85.0 MPa, more preferably not more than 80.0 MPa.

In this specification, the values of the complex elastic modulus $E^*$ refer to those measured with a viscoelastic spectrometer manufactured by Iwamoto Seisakusyo K.K according to the Japanese Industrial Standard K6394 under the following condition:
  initial strain: 10%
  amplitude: plus/minus 1.0%
  frequency: 10 Hz
  temperature: 70 degrees The radial height H3 from the bead base line BL of the radially outer end 11be of the radial part 11b is more than the radial height H2 of the carcass ply turnup portion 6b.

If the difference therebetween is too small, then a large rigidity difference is formed in the bead portion 4, and it becomes difficult to mitigate the stress at the radially outer end 6be of the carcass ply turnup portion 6b.

Therefore, the radial distance D1(=H3-H2) between the radially outer end 11be of the radial part 11b and the radially outer end 6be of the carcass ply turnup portion 6b is preferably not less than 5 mm, more preferably not less than 7 mm, still more preferably not less than 8 mm.

However, it is more preferable that the radial height H3 is less than the radial height H1 of the bead apex 8, and the distance D1 is not more than 15 mm, more preferably not more than 10 mm in order to decrease the rigidity of the bead portion 4 gradually towards the radially outside and thereby to achieve the ride comfort and steering stability in a well balanced manner.

In this embodiment, as shown in FIG. 3, the bead apex 8 further includes an edge cover 13 disposed along the axially outer surface of the bead apex 8.

The edge cover 13 is made of a rubber compound having a complex elastic modulus $E^*$ less than that of the outer bead apex 12, more specifically, in a range of 6.0 to 9.0 MPa.

In the tire radial direction, the edge cover 13 is centered on the radially outer end 6be of the carcass ply turnup portion 6b, and extends radially inwards and outwards therefrom with a relatively small thickness t5 for example less than the thickness of the outer bead apex 12, more specifically, about 0.5 to 2.0 mm. The radially outer end of the edge cover 13 is positioned radially outside the radially outer end 11be of the radial part 11b of the L-shaped inner bead apex 11. The radially inner end of the edge cover 13 is positioned radially inside the radially outer end 9be of the radially outer part 9b of the reinforcing cord layer 9.

Thus, the rubber edge cover 13 is positioned between the radially outer end 6be of the carcass ply turnup portion 6b and the outer bead apex 12, therefore, the stress at the radially outer end 6be is mitigated, and the cord end loose and ply edge loose can be effectively prevented.

In this embodiment, further, in order to make a pair with the edge cover 13, an insulation rubber layer 14 is disposed axially outside the radially outer end 6be of the carcass ply turnup portion so as to extends radially inwards and outwards therefrom.

The insulation rubber layer 14 extends to a position between the carcass ply turnup portion 6b and the radially outer part 9b of the reinforcing cord layer 9, so that the cord spacing between the carcass ply turnup portion 6b and the radially outer part 9b is increased gradually towards the radially outside of the tire, to thereby prevent the fretting corrosion or wear. The radially outer end of the insulation rubber layer 14 is positioned at a radial height almost same as or slightly higher than the radially outer end of the edge cover 13, but lower than the radially outer end of the clinch rubber layer 15 which is lower than the radially outer end of the outer bead apex 12.

As shown in FIG. 3, at the position of the radially outer end 6be of the carcass ply turnup portion 6b, it is preferable that the ratio (ta/t1) of a thickness (ta) of the outer bead apex 12 to a thickness (t1) of the bead apex 8 is set in a range of from 0.75 to 0.95.

The thickness (t1) is defined as the distance between the carcass cords in the carcass ply main portion 6a and the carcass cords in the carcass ply turnup portion 6b which is measured along a straight line M1 drawn perpendicularly to the carcass ply main portion 6a from the radially outer end 6be of the carcass ply turnup portion 6b.

The thickness (ta) is defined as the distance between the axially outer surface of the L-shaped inner bead apex 11 and the carcass cords in the carcass ply turnup portion 6b which is measured along the straight line M1.

Thus, there is a possibility that the thickness (t1, ta) includes those of the topping rubber of the carcass cords and the edge cover 13 used in this embodiment.

Further, at the position of an intersecting point S, it is preferable that the ratio (tb/t2) of the thickness (tb) of the outer bead apex 12 to the thickness (t2) of the bead apex 8 is set in a range of from 0.75 to 0.95.

The intersecting point s is that of the axially inner surface of the carcass ply turnup portion 6b and a straight line x drawn parallel to the tire axial direction from the radially outer end 9be of the radially outer part 9b of the reinforcing cord layer. The thickness (t2) is defined as the distance between the carcass cords in the carcass ply main portion 6a and the carcass cords in the carcass ply turnup portion 6b which is measured along a straight line M2 drawn perpendicularly to the carcass ply main portion 6a from the intersecting point S. The thickness (tb) is defined as the distance between the axially outer surface of the L-shaped inner bead apex 11 and the carcass cords in the carcass ply turnup portion 6b which is measured along the straight line M2.

In this case too, there is a possibility that the thickness (t2, tb) includes those of the topping rubber of the carcass cords and the edge cover 13 used in this embodiment.

By limiting the ratio (ta/t1) and ratio (tb/t2) as above, it is possible to prevent a stress concentration liable to occur on the outer bead apex 12 during use due to the difference in the complex elastic modulus between the L-shaped inner bead apex 11 and outer bead apex 12.

If the ratio (ta/t1) or ratio (tb/t2) is less than 0.75, since the rigidity of the radial part 11b of the L-shaped inner bead apex 11 is increased, the deformation of the radial part 11b during use is decreased and as a result, the stress concentrates on the outer bead apex 12.

If the ratio (ta/t1) or ratio (tb/t2) is more than 0.95, the radial part 11b of the L-shaped inner bead apex 11 can not increase the bending rigidity of the bead portion 4 sufficiently, therefore, the bead portion 4 under load is largely bent axially outwards, and the stress concentrates on the radially outer end 6be of the carcass ply turnup portion 6b.

Especially, it is preferable that the ratio (ta/t1) is not less than 0.80, still more preferably not less than 0.85, but not more than 0.92, still more preferably not more than 0.90, and the ratio (tb/t2) is not less than 0.78, still more preferably not less than 0.80, but not more than 0.90, still more preferably not more than 0.85.

Furthermore, it is preferable that the ratio (ta/t1) is not less than the ratio (tb/t2). As a result, the radial part 11b can effectively control the cord end loose at the radially outer end 9be of the radially outer part 9b of the reinforcing cord layer 9.

In the bead portion 4 in this embodiment, the radial part 11b of the L-shaped inner bead apex 11, the carcass ply turnup portion 6b of the carcass ply 6A, and the radially outer part 9b of the reinforcing cord layer 9 are arranged such that their radially outer ends 11be, 6be and 9be are shifted from each other in the tire radial direction as shown in FIG. 2. Therefore, the stress during running is deconcentrated on the outer ends 11be, 6be and 9be, and the bead durability can be effectively improved.

Comparison Tests

Heavy-duty pneumatic tires having the bead structures shown in FIGS. 2, 4 and 5 were made and tested as follows. The specifications of the test tires are shown in Table 1. The rest is common to all of the tires. Main common specifications are as follows:

Tire size: 11R22.5
   Tire cross-section height H: 239.8 mm
   Carcass: single ply of steel cords
   Carcass cord angle (WRT tire equator): 88 degrees
   Belt: four plies of steel cords
   Belt cord angles (WRT tire equator): 50, 18, 18 and 18 degrees (from radially inside to outside)
   Belt cord inclining directions: R, R, L and L (from radially inside to outside), wherein
     "R" means a right-side upward inclination, and
     "L" means a left-side upward inclination in the plan view of the tread portion of the tire of which tire equator is laid vertically.
   Bead apex thickness t1: 14 mm
   Bead apex thickness t2: 16 mm
   Complex elastic modulus E*1 of Inner bead apex: 75.0 MPa
   Complex elastic modulus E*2 of Outer bead apex: 5.0 MPa
   Reinforcing cord layer: single ply of steel cords
   Wheel rim size: 22.5×7.50
   Rim flange height H5: 12.7 mm
   Tire pressure: 800 kPa
Tire Weight The weight of the test tire is indicated in Table 1 by an index based on Ref.1 being 100. The smaller value is better.

Bead Durability Test

Using a tire test drum, the test tire was continuously run at a speed of 20 km/h under an accelerated condition of tire load 47.4 kN (200% of the maximum load) until any damage was observed in the bead portions to obtain the running time. The running times obtained are indicated in Table 1 by an index based on Ref.1 being 100, wherein the larger the value, the better the bead durability.

Steering Stability Test

Using a static tire tester, by applying a vertical tire load of 26.7 kN and a lateral tire load of 2.0 kN to the test tire, the lateral deflection of the tire was measured, and the lateral spring constant of the tire was determined as the ratio (lateral load/lateral deflection). The results are indicated in Table 1 by an index base on Ref.1 being 100, wherein the larger the value, the better the steering stability.

From the test results, it was confirmed that, according to the present invention, the weight of the tire can be reduced without sacrificing the bead durability and steering stability.

TABLE 1

Figure 4:
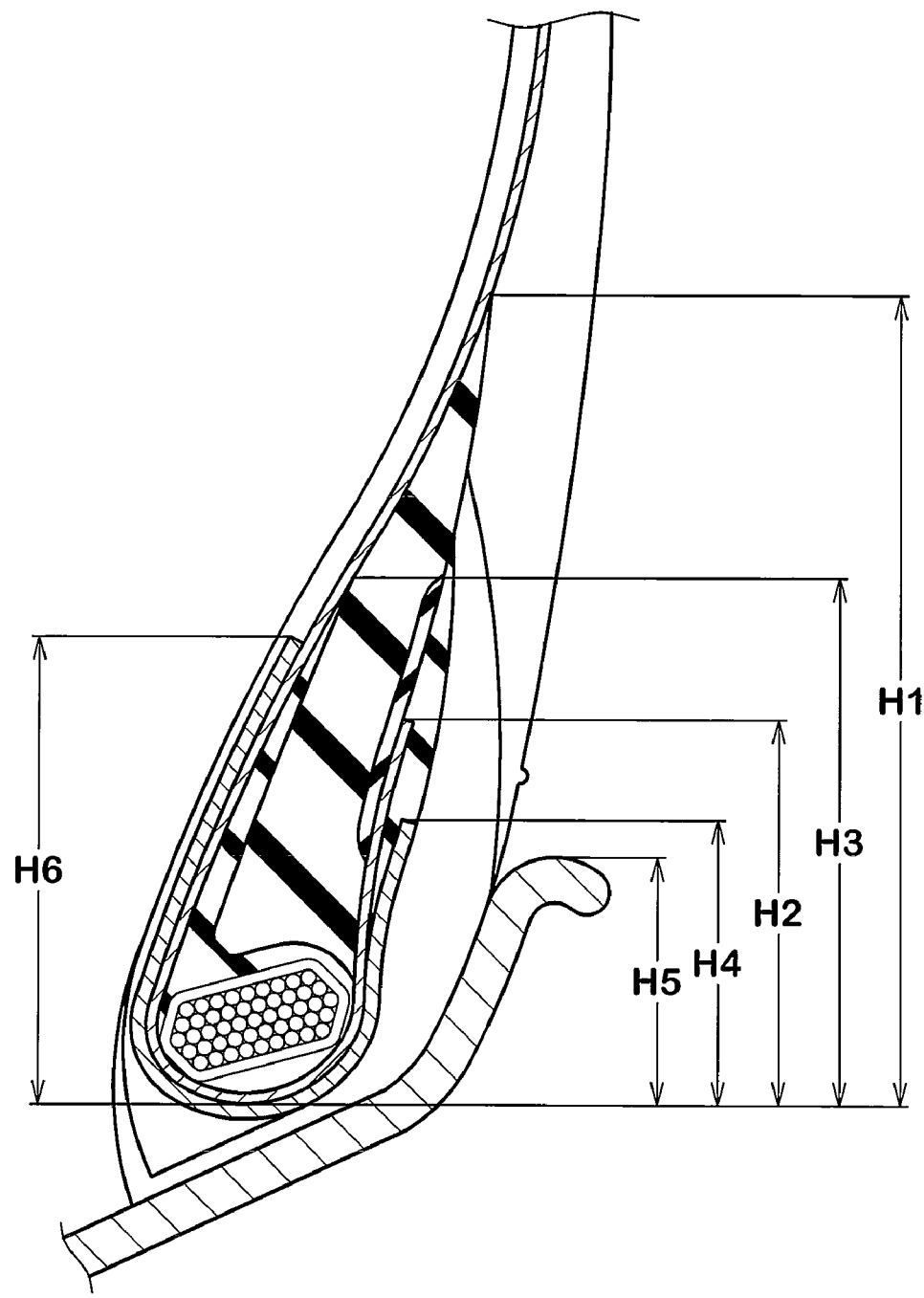
FIG. 4 and FIG. 5 are cross-sectional views of comparative examples
Figure 5:
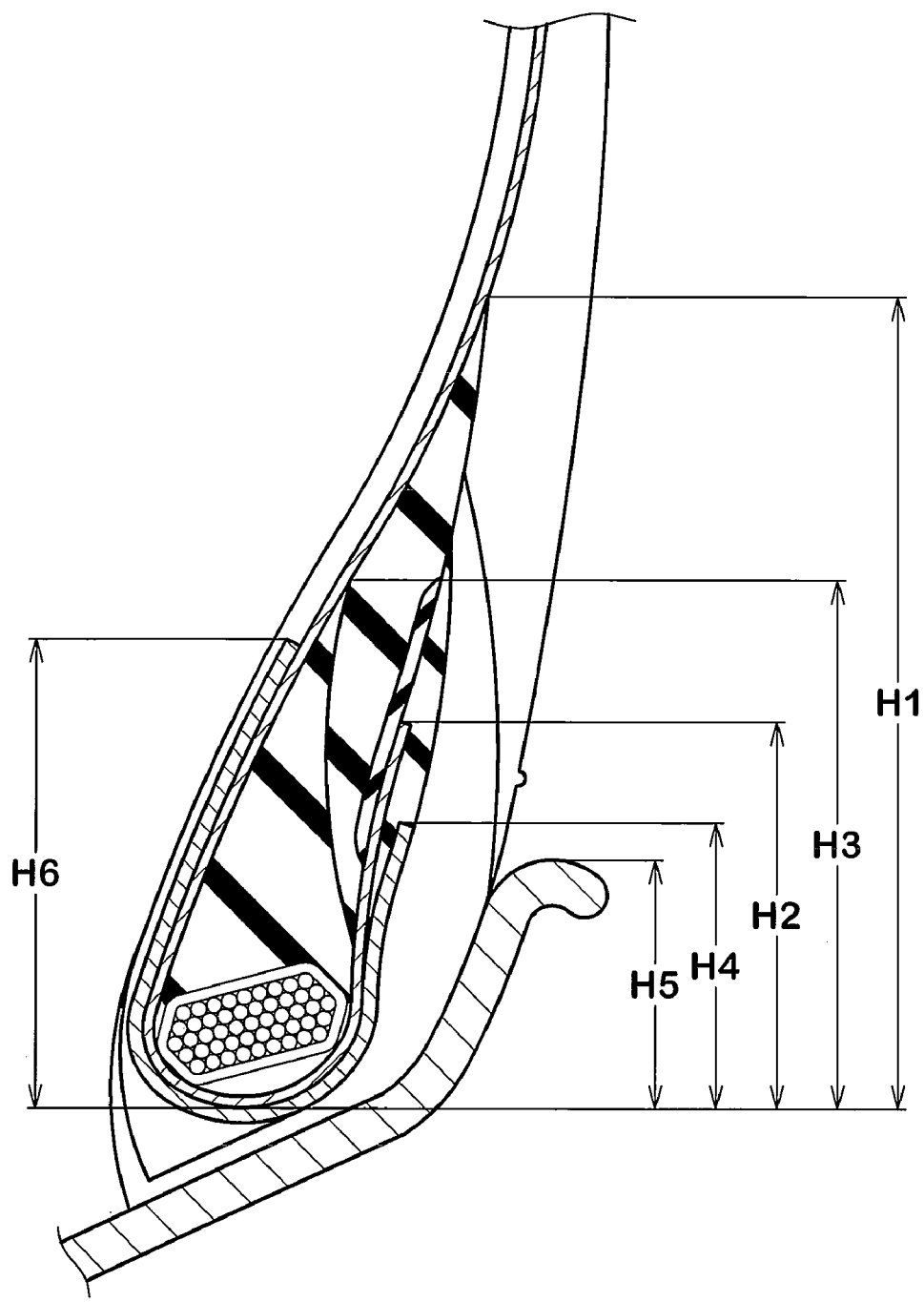
Figure 6:
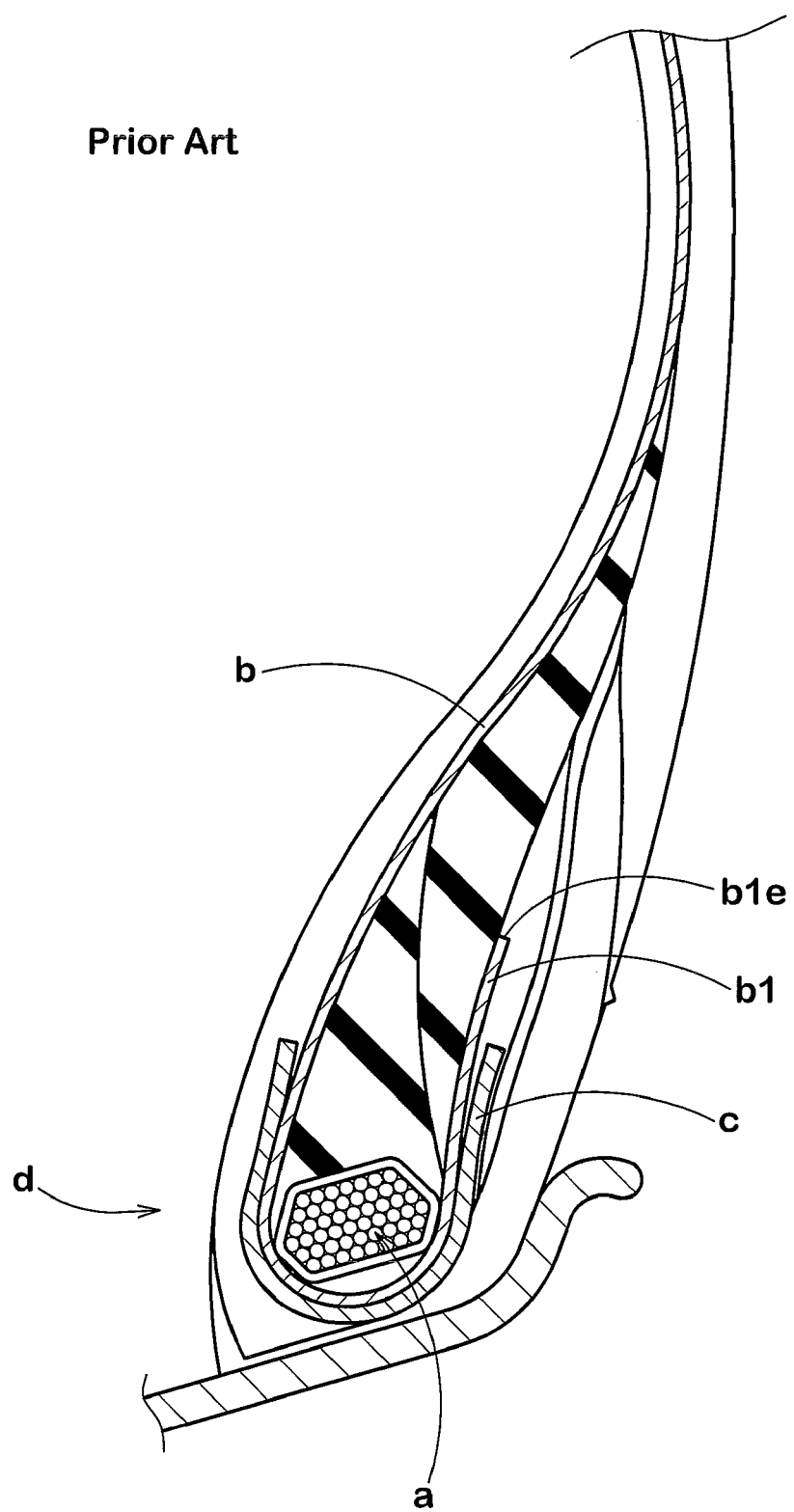
FIG. 6 is a cross-sectional view of a bead portion of a prior art tire.

| Tire | Ref. 1 | Ref. 2 | Ref. 3 | Ref. 4 | Ref. 5 | Ex. 1 | Ex. 2 | Ex. 3 | Ex. 4 |
|---|---|---|---|---|---|---|---|---|---|
| Bead structure Cross sectional shape | FIG. 5 | FIG. 4 | FIG. 2 | FIG. 2 | FIG. 2 | FIG. 2 | FIG. 2 | FIG. 2 | FIG. 2 |
| Inner bead apex | Δ | L | L | L | L | L | L | L | L |
| Bead reinforcing layer | U | U | L | L | L | L | L | L | L |
| Height H1 of Bead apex (mm) | 80 | 80 | 80 | 80 | 80 | 80 | 80 | 80 | 80 |
| Height H2 of Carcass ply turnup portion (mm) | 37 | 37 | 37 | 37 | 37 | 37 | 37 | 37 | 37 |
| Height H3 of Radial part of Inner bead apex (mm) | 45 | 45 | 45 | 32 | 45 | 45 | 45 | 45 | 45 |
| Height H4 of Outer part of Reinforcing cord layer (mm) | 27 | 27 | 27 | 27 | 37 | 27 | 27 | 27 | 27 |
| Height H6 of Inner part of Reinforcing cord layer (mm) | 41 | 41 | 0 | 0 | 0 | 0 | 0 | 0 | 0 |
| Distance D1 (=H3 − H2) (mm) | 8 | 8 | 8 | −5 | 8 | 8 | 8 | 8 | 8 |
| Distance D2 (=H2 − H4) (mm) | 10 | 10 | 10 | 10 | 0 | 10 | 10 | 10 | 10 |
| Ratio (ta/t1) | 0.65 | 0.70 | 0.70 | 1.00 | 0.86 | 0.86 | 0.90 | 0.90 | 0.95 |
| Ratio (tb/t2) | 0.35 | 0.70 | 0.70 | 0.95 | 0.86 | 0.86 | 0.86 | 0.90 | 0.95 |
| Angle of steel cords of Bead reinforcing layer (deg.) | 25 | 25 | 25 | 25 | 25 | 50 | 50 | 50 | 50 |
| Tire weight (index) | 100 | 98 | 90 | 90 | 92 | 90 | 90 | 90 | 90 |
| Bead durability (index) | 100 | 100 | 100 | 90 | 95 | 102 | 105 | 102 | 102 |
| Steering stability (index) | 100 | 100 | 100 | 100 | 100 | 100 | 100 | 100 | 100 |

| Tire | Ex. 5 | Ex. 6 | Ex. 7 | Ex. 8 | Ex. 9 | Ex. 10 | Ex. 11 | Ex. 12 |
|---|---|---|---|---|---|---|---|---|
| Bead structure Cross sectional shape | FIG. 2 | FIG. 2 | FIG. 2 | FIG. 2 | FIG. 2 | FIG. 2 | FIG. 2 | FIG. 2 |
| Inner bead apex | L | L | L | L | L | L | L | L |
| Bead reinforcing layer | L | L | L | L | L | L | L | L |
| Height H1 of Bead apex (mm) | 80 | 80 | 80 | 80 | 80 | 80 | 80 | 80 |
| Height H2 of Carcass ply turnup portion (mm) | 37 | 37 | 37 | 37 | 37 | 37 | 37 | 37 |
| Height H3 of Radial part of Inner bead apex (mm) | 45 | 50 | 40 | 45 | 45 | 45 | 45 | 45 |
| Height H4 of Outer part of Reinforcing cord layer (mm) | 27 | 27 | 27 | 15 | 20 | 27 | 27 | 27 |
| Height H6 of Inner part of Reinforcing cord layer (mm) | 0 | 0 | 0 | 0 | 0 | 0 | 0 | 0 |
| Distance D1 (=H3 − H2) (mm) | 8 | 13 | 3 | 8 | 8 | 8 | 8 | 8 |
| Distance D2 (=H2 − H4) (mm) | 10 | 10 | 10 | 22 | 17 | 10 | 10 | 10 |
| Ratio (ta/t1) | 0.90 | 0.90 | 0.90 | 0.90 | 0.90 | 0.90 | 0.90 | 0.90 |
| Ratio (tb/t2) | 0.86 | 0.86 | 0.86 | 0.86 | 0.86 | 0.86 | 0.86 | 0.86 |
| Angle of steel cords of Bead reinforcing layer (deg.) | 50 | 50 | 50 | 50 | 50 | 35 | 50 | 65 |
| Tire weight (index) | 90 | 90 | 90 | 88 | 89 | 90 | 90 | 90 |
| Bead durability (index) | 102 | 105 | 102 | 102 | 102 | 100 | 105 | 103 |
| Steering stability (index) | 100 | 100 | 100 | 100 | 100 | 100 | 100 | 100 |

The invention claimed is:

1. A heavy-duty pneumatic tire comprising:
a tread portion;
a pair of sidewall portions;
a pair of bead portions each with a bead core therein;
a carcass ply of cords extending the bead portions through the tread portion and sidewall portions and turned up around the bead core in each of the head portions from the inside to the outside of the tire so as to have a pair of carcass ply turnup portions and a carcass ply main portion therebetween;
a bead apex disposed in each of the bead portions and extending radially outwardly from the bead core in a tapered manner, wherein
the bead apex includes an L-shaped inner bead apex which is made of a high-modulus rubber, and an outer bead apex which is made of a low-modulus rubber having a lower modulus than that of the L-shaped inner bead apex,
the L-shaped inner bead apex comprises a base part which extends along a radially outer surface of the bead core, and a radial part which extends radially outwardly from the axially inner end of the base part along the carcass ply main portion and terminates at a position radially outside the radially outer end of the carcass ply turnup portion, the radial part having a thickness gradually decreasing towards the radially outside of the tire, the outer bead apex is disposed on the radially outside of the base part of the L-shaped inner bead apex and on the axially outside of the radial part of the L-shaped inner bead apex, the outer bead apex extending radially outwardly in a tapered manner; and an L-shaped reinforcing cord layer disposed in each of the bead portions, and comprising an inner part which extends on the radially inner side of the bead core, and an outer part which extends radially outwardly from the inner part along the axially outer surface of the carcass ply turnup portion and terminates so as to have a radially outer end positioned radially inside the radially outer end of the carcass ply turnup portion, wherein when measured along a straight line drawn perpendicularly to the carcass ply main portion from the radially outer end of the carcass ply turnup portion, a ratio ta/t1 of the thickness ta of the outer bead apex to a bead apex thickness t1 between the carcass ply main portion and turnup portion is in a range of from 0.75 to 0.95, and when measured along a straight line drawn perpendicularly to the carcass ply main portion from an intersecting point between the carcass ply turnup portion and a straight line X drawn parallel to the tire axial direction from the radially outer end of the outer part of the reinforcing cord layer, a ratio tb/t2 of the thickness tb of the outer bead apex to a bead apex thickness t2 between the carcass ply main portion and turnup portion is in a range of from 0.75 to 0.95.

2. The heavy-duty pneumatic tire according to claim 1, wherein the reinforcing cord layer is a single ply of steel cords arranged at an angle of from 35 to 65 degrees with respect to the tire circumferential direction.

3. The heavy-duty pneumatic tire according to claim 1, wherein the ratio ta/t1 is not less than the ratio tb/t2.

4. The heavy-duty pneumatic tire according to claim 3, wherein the reinforcing cord layer is a single ply of steel cords arranged at an angle of from 35 to 65 degrees with respect to the tire circumferential direction.

* * * * *